(12) United States Patent
Booker et al.

(10) Patent No.: US 11,686,660 B2
(45) Date of Patent: Jun. 27, 2023

(54) PARTICLE CONCENTRATION ANALYZING SYSTEM AND METHOD

(71) Applicant: Sensors, Inc., Saline, MI (US)

(72) Inventors: David R. Booker, Ann Arbor, MI (US); Douglas D. Booker, Lancaster (GB); Simon P. Booker, Cynon Taf (GB)

(73) Assignee: SENSORS, INC., Saline, MI (US)

( * ) Notice: Subject to any disclaimer, the term of this patent is extended or adjusted under 35 U.S.C. 154(b) by 175 days.

(21) Appl. No.: 17/052,950

(22) PCT Filed: Jun. 6, 2019

(86) PCT No.: PCT/IB2019/054740
§ 371 (c)(1),
(2) Date: Nov. 4, 2020

(87) PCT Pub. No.: WO2019/234688
PCT Pub. Date: Dec. 12, 2019

(65) Prior Publication Data
US 2021/0231551 A1 Jul. 29, 2021

Related U.S. Application Data

(60) Provisional application No. 62/681,803, filed on Jun. 7, 2018.

(51) Int. Cl.
G01N 15/06 (2006.01)
G01N 15/00 (2006.01)
G01N 1/22 (2006.01)

(52) U.S. Cl.
CPC ......... G01N 15/065 (2013.01); G01N 1/2252 (2013.01); G01N 2015/0046 (2013.01)

(58) Field of Classification Search
CPC ......... G01N 15/065; G01N 2015/0046; G01N 1/2252
See application file for complete search history.

(56) References Cited

U.S. PATENT DOCUMENTS 3,694,085 A 9/1972 Rich
3,721,804 A 3/1973 Feldman
(Continued)

FOREIGN PATENT DOCUMENTS

CA 990007 A 6/1976
CA 3010613 A1 7/2017
(Continued)

OTHER PUBLICATIONS

European Search Report from corresponding European Application No. 19814777.9, dated Jan. 19, 2022.
(Continued)

Primary Examiner — Alexander A Mercado
Assistant Examiner — John M Royston
(74) Attorney, Agent, or Firm — Gardner, Linn, Buckhart & Ondersma

(57) ABSTRACT

A particle concentration analyzing system for testing particle concentrations in a fluid sample, such as engine emission particle concentration present in the exhaust of an engine. The particle concentration analyzing system includes a condensation particle counter having a saturation chamber, a condenser, and a laser optic particle counter. The analyzing system further includes a working fluid tank, a working fluid pump, and a sampling probe. The system provides a robust analysis system for a user to test vehicle emissions without being highly trained on the device, as the device is protected from misuse. A position sensitive sensor is used to ensure that the system is not damaged if the system is tipped over or placed in a position that would produce false results. Additional features include differential pressure sensors, a sealed and replaceable tamper resistant working fluid tank, a solvent recovery system, an anti-cheat device, and fluid purity sensors.

20 Claims, 9 Drawing Sheets

(56) References Cited

U.S. PATENT DOCUMENTS

| | | | |
|---|---|---|---|
| 3,849,178 A | 11/1974 | Feldman | |
| 3,877,200 A | 4/1975 | Feldman | |
| 4,263,002 A | 4/1981 | Sathyakumar | |
| 4,293,217 A | 10/1981 | Bird, Jr. | |
| 4,331,037 A | 5/1982 | Du Vall | |
| 4,387,993 A | 6/1983 | Adrian | |
| 4,394,825 A | 7/1983 | Du Vall | |
| 4,449,816 A | 5/1984 | Kohsaka et al. | |
| 4,471,654 A | 9/1984 | Du Vall | |
| 4,503,706 A | 3/1985 | Kolodjski | |
| 4,523,462 A | 6/1985 | Kolodjski | |
| 4,596,140 A | 6/1986 | Dorman et al. | |
| 4,772,081 A | 9/1988 | Borgos et al. | |
| 4,787,251 A | 11/1988 | Kolodjski | |
| 4,790,650 A | 12/1988 | Keady | |
| 4,843,564 A | 6/1989 | Jenson | |
| 4,875,755 A | 10/1989 | Borgos et al. | |
| 4,948,257 A | 8/1990 | Kaufman et al. | |
| 4,950,073 A | 8/1990 | Sommer | |
| 4,973,969 A | 11/1990 | Jenson | |
| 5,026,155 A | 6/1991 | Ockovic et al. | |
| 5,076,097 A | 12/1991 | Zarrin et al. | |
| 5,084,614 A | 1/1992 | Berkner | |
| 5,085,500 A | 2/1992 | Blesener | |
| 5,098,657 A | 3/1992 | Blackford et al. | |
| 5,118,959 A | 6/1992 | Caldow et al. | |
| 5,121,988 A | 6/1992 | Blesener et al. | |
| 5,239,356 A | 8/1993 | Hollander et al. | |
| 5,247,842 A | 9/1993 | Kaufman et al. | |
| 5,262,841 A | 11/1993 | Blesener et al. | |
| 5,343,744 A | 9/1994 | Ammann | |
| 5,351,523 A | 10/1994 | Blackford et al. | |
| 5,374,396 A | 12/1994 | Blackford et al. | |
| 5,453,837 A | 9/1995 | Naqwi et al. | |
| 5,513,004 A | 4/1996 | Naqwi et al. | |
| 5,561,515 A | 10/1996 | Hairston et al. | |
| 5,675,405 A | 10/1997 | Schildmeyer et al. | |
| 5,684,587 A | 11/1997 | Naqwi | |
| 5,784,160 A | 7/1998 | Naqwi | |
| 5,872,622 A | 2/1999 | Schildmeyer et al. | |
| 5,903,338 A | 5/1999 | Mavliev et al. | |
| 6,064,473 A | 5/2000 | Hironaga et al. | |
| 6,125,845 A | 10/2000 | Halvorsen et al. | |
| 6,158,293 A | 12/2000 | Poole | |
| 6,158,431 A | 12/2000 | Poole | |
| 6,230,572 B1 | 5/2001 | Pui et al. | |
| 6,469,780 B1 | 10/2002 | McDermott et al. | |
| 6,498,641 B1 | 12/2002 | Schildmeyer | |
| 6,567,157 B1 | 5/2003 | Flagan et al. | |
| 6,829,044 B2 | 12/2004 | Liu | |
| 6,980,284 B2 | 12/2005 | Min et al. | |
| 7,363,828 B2 | 4/2008 | Liu | |
| 7,647,811 B2 | 1/2010 | Wei et al. | |
| 7,724,368 B2 | 5/2010 | Min | |
| 7,796,727 B1 | 9/2010 | Kaufman | |
| 7,806,968 B2 | 10/2010 | Wei et al. | |
| 8,047,055 B2 | 11/2011 | Wang et al. | |
| 8,072,598 B2 | 12/2011 | Min | |
| 8,208,132 B2 | 6/2012 | Huetter et al. | |
| 8,465,791 B2 | 6/2013 | Liu et al. | |
| 8,534,116 B2 | 9/2013 | Wang et al. | |
| 8,943,873 B2 | 2/2015 | Vanhanen et al. | |
| 9,194,234 B2 | 11/2015 | Komatsubara et al. | |
| 9,726,579 B2 | 8/2017 | Han et al. | |
| 2002/0157446 A1 | 10/2002 | Dilger | |
| 2003/0199100 A1 | 10/2003 | Wick | |
| 2004/0140327 A1* | 7/2004 | Osborne | F16N 35/00 222/386.5 |
| 2006/0096394 A1 | 5/2006 | Nelson et al. | |
| 2006/0126056 A1 | 6/2006 | Roberts | |
| 2006/0266133 A1* | 11/2006 | Kim | G01F 1/22 73/865.5 |
| 2007/0039295 A1* | 2/2007 | Ohno | B01J 23/58 55/482 |
| 2007/0047836 A1 | 3/2007 | Pan | |
| 2007/0056395 A1 | 3/2007 | Bae et al. | |
| 2008/0047373 A1 | 2/2008 | Ahn | |
| 2008/0152547 A1 | 6/2008 | Hopke et al. | |
| 2008/0186489 A1 | 8/2008 | Ahn | |
| 2009/0009748 A1 | 1/2009 | Ahn | |
| 2009/0031828 A1* | 2/2009 | Ulevicius | G01N 15/065 73/863.21 |
| 2009/0143503 A1* | 6/2009 | Romero-Nochebuena | C09J 103/02 524/52 |
| 2011/0259426 A1 | 10/2011 | Cramer | |
| 2012/0012744 A1 | 1/2012 | Wang et al. | |
| 2012/0222495 A1* | 9/2012 | Bates | G01N 1/24 73/861.61 |
| 2013/0180321 A1 | 7/2013 | Shinohara et al. | |
| 2014/0060155 A1 | 3/2014 | Hering et al. | |
| 2014/0172315 A1* | 6/2014 | Vandersleen | G01N 33/48 702/19 |
| 2014/0268476 A1 | 9/2014 | Han | |
| 2014/0284204 A1 | 9/2014 | Sipila et al. | |
| 2014/0339415 A1† | 11/2014 | Caldow | |
| 2014/0347663 A1 | 11/2014 | Rodes et al. | |
| 2014/0354976 A1 | 12/2014 | Evenstad et al. | |
| 2015/0160105 A1 | 6/2015 | Caldow et al. | |
| 2016/0059249 A1 | 3/2016 | Scheckman et al. | |
| 2016/0061709 A1 | 3/2016 | Kaufman et al. | |
| 2016/0178434 A1 | 6/2016 | Buckley et al. | |
| 2017/0276589 A1 | 9/2017 | Oberreit | |
| 2017/0299487 A1* | 10/2017 | Wang | G01N 1/38 |
| 2018/0045636 A1 | 2/2018 | Avula et al. | |
| 2018/0136106 A1 | 5/2018 | Mölter et al. | |
| 2019/0195765 A1* | 6/2019 | Chen | G01N 15/065 |

FOREIGN PATENT DOCUMENTS

| | | |
|---|---|---|
| CN | 104880339 A | 9/2015 |
| CN | 105334146 A | 2/2016 |
| CN | 103175767 B | 8/2016 |
| CN | 106030289 A | 10/2016 |
| CN | 106290744 A | 1/2017 |
| CN | 107107122 A | 8/2017 |
| DE | 19859211 A1 | 7/2000 |
| DE | 10030134 A1 | 1/2002 |
| DE | 10084713 B3 | 3/2012 |
| DE | 102005001992 B4 | 8/2012 |
| DK | 233282 A | 11/1983 |
| EP | 95000 A1 | 11/1983 |
| EP | 1655595 A1 | 5/2006 |
| EP | 2607882 A2 | 6/2013 |
| FR | 2570829 A1 | 3/1986 |
| GB | 1497659 A | 1/1978 |
| GB | 2443110 A | 4/2008 |
| JP | 5170004 B2 | 3/2013 |
| JP | 2013190246 A | 9/2013 |
| JP | 5883641 B2 | 3/2016 |
| NZ | 205034 A | 6/1986 |
| SE | 394893 B | 7/1977 |
| TW | 201805612 A | 2/2018 |
| WO | 9010858 A1 | 9/1990 |
| WO | 9706525 A1 | 2/1997 |
| WO | 9841876 A1 | 9/1998 |
| WO | 2005039780 A2 | 5/2005 |
| WO | 2005114131 A2 | 12/2005 |
| WO | 2006127803 A2 | 11/2006 |
| WO | 2009103063 A2 | 8/2009 |
| WO | 2010085085 A2 | 7/2010 |
| WO | 2010039861 A1 | 12/2010 |
| WO | 2014033040 A1 | 3/2014 |
| WO | 2016133834 A2 | 8/2016 |
| WO | 2018058236 A1 | 4/2018 |

OTHER PUBLICATIONS

International Search Report and Written Opinion of the International Searching Authority from corresponding Patent Cooperation

(56) References Cited

OTHER PUBLICATIONS

Treaty (PCT) Application No. PCT/IB2019/054740, indicated completed on Dec. 3, 2019.

\* cited by examiner
† cited by third party

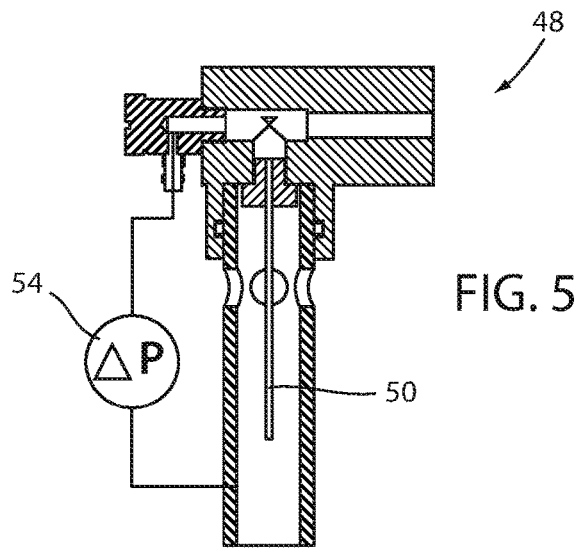
FIG. 5
FIG. 6A
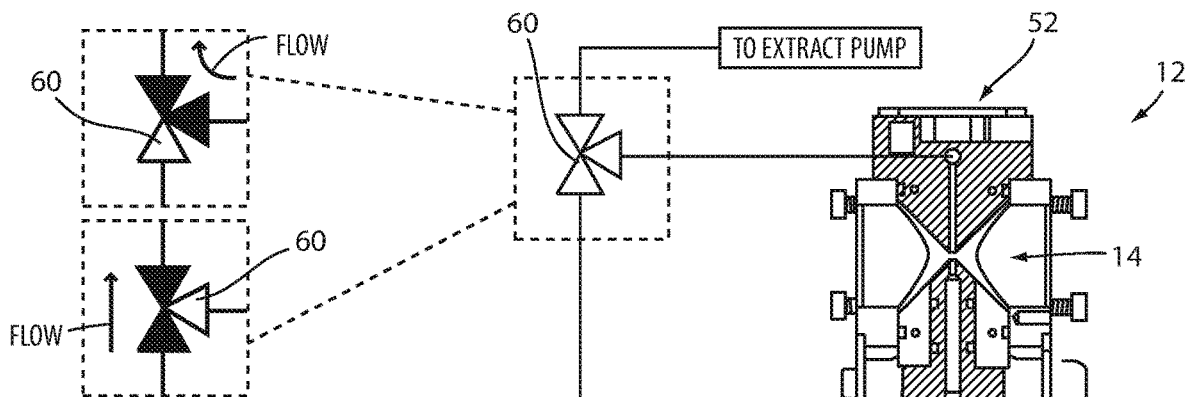
FIG. 6B
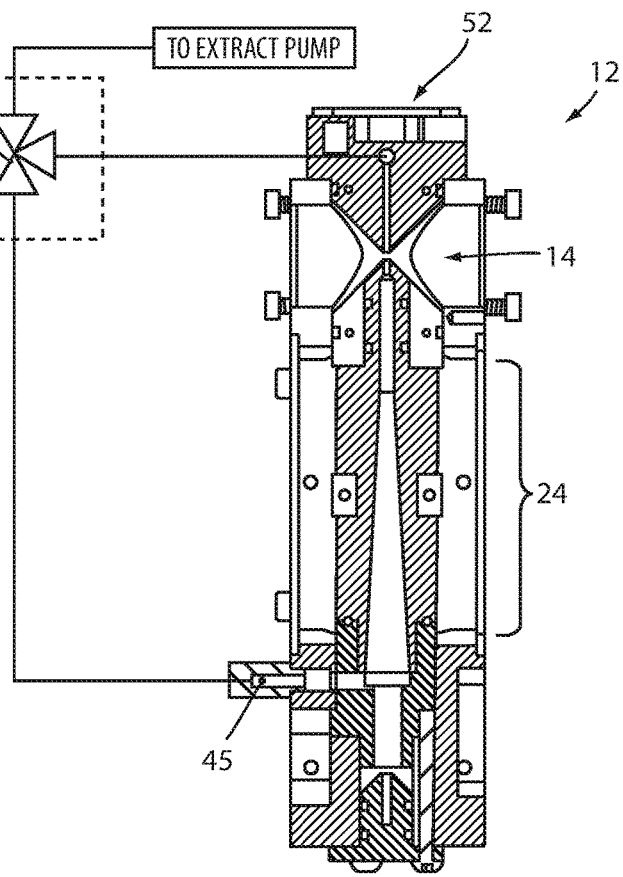
FIG. 6

PARTICLE CONCENTRATION ANALYZING SYSTEM AND METHOD

CROSS-REFERENCE TO RELATED APPLICATIONS

The present application claims the priority benefits of International Patent Application No. PCT/IB2019/054740, filed Jun. 6, 2019, and claims benefit of U.S. provisional application, Ser. No. 62/681,803, filed on Jun. 7, 2018, each of which are hereby incorporated herein by reference in their entireties.

FIELD OF THE INVENTION

The present invention relates to a system for analyzing particle concentration, particularly related to a condensation particle counter.

BACKGROUND OF THE INVENTION

Emissions from engines and air quality standards are increasingly critical on Earth as more and more vehicles fill the highways and fields of the world and environmental polluters continue to emit pollutants. Emission testing of vehicle engine exhaust is a worldwide concern for ensuring that engines are not over-polluting Earth. Current measurement systems are typically large, expensive, and time-consuming. Moreover, large scale periodic checking of the vehicles emissions is required for all pollutants to ensure that the engine remains compliant throughout its useful lifetime. Another concern in vehicle emissions testing is the possibility for testing facilities, technicians, or customers to "cheat" the test by allowing ambient air to infiltrate the test and showing a false pass.

One type of emissions analyzer is a mixing-type Condensation Particle Counter (CPC) for the measurement of particle number concentrations in the size range from 10 to 200 nm (Nanometers). Such particle counters are used for determining particle concentration in engine emissions, for monitoring environmental air quality, as well as other applications where particle concentration is of concern. CPCs require periodic filling with a working fluid (for example Butanol or iso-propyl alcohol). Filling is normally achieved using a gravity feed system or a syringe from an external tank.

SUMMARY OF THE INVENTION

The following relates to low-cost and low-complexity products developed for air quality testing and analysis, such as tail-pipe particle number (PN) concentration measurements associated with, in particular, Periodic Technical Inspection (PTI). Condensation Particle Counters (CPC's) are often used to perform air quality testing and analysis to count particles in a sample fluid. CPC's typically require a skilled operator to monitor the instrument, for example monitoring a working fluid and ensuring that the working fluid is always sufficiently filled as well as sufficiently pure or uncontaminated. The application of low-cost emissions testing technology in Periodic Technical Inspection (PTI) of automotive vehicles necessitates not only a low-cost, repeatable, and accurate measurement device but preferably automated system and measurement checks to confirm the device is operating properly and being used correctly.

In one aspect of the present invention, a particle concentration analyzing system including a condensation particle counter is provided to analyze a particle concentration in a sample of vehicle emission. The analysis includes inserting a sampling probe into the vehicle being tested and recording over a prescribed test sequence (e.g. idle engine operation) the particulate number concentration of the emissions of the vehicle. A vehicle would be deemed to pass or fail this emissions test if the recorded level was above the applicable standard.

In one aspect, a fully integrated particle concentration analyzing system in accordance with the present invention utilizes a CPC coupled with a sampling probe and ambient air conditioning system to analyze particle concentration in a sample of vehicle emission. The analyzing system is configurable to determine if a vehicle engine passes or fails during a PTI particle number (PN) test, where the engine is idling. The analyzer is further configurable to determine if a vehicle engine passes or fails during a PTI particle number test where the vehicle is tested over three 1-minute samples following a "snap acceleration" with a maximum allowed particle number measured is less than 250,000 #cm$^{-3}$.

In one aspect of the present invention, an on-board diagnostics (OBD) system is incorporated with the analyzing system that is configured to ensure the vehicle is "warmed-up" and ready for the PTI PN test. During the test, second by second data of both the OBD parameters (RPM, Coolant Temperature and mass airflow rate) and the PN concentrations are recorded to facilitate additional data evaluations as well as the PTI PN pass or fail result.

Mixing-type CPCs, operate with an aerosol flow (sample flow) is kept separate from the source of saturated air and mixed prior to being transported through the condenser. Full-flow CPCs operate with the particle laden (sample) air passes through a heated wick surrounded by the working fluid to become saturated. For both full-flow and mixing type CPCs, the super-saturated vapor condenses on the sample particles and grows them to about 5-10 μm droplets. These drops are then focused through a nozzle, passed through a laser beam, and are counted by a light scattering particle counter, such as pulse detection electronics. The mixing-type CPC provides beneficial attributes over full-flow CPCs, including no performance degradation associated with the saturator or wick, because the wick does not become contaminated with sample particles which results in lower super-saturation levels over time.

The saturator can be mechanically decoupled from the condenser and measurement optics, thereby improving robustness, including significantly less sensitivity to optics contamination from the working fluid caused by vibration, orientation, etc.

The analyzing system includes an electronic controller having a dedicated microprocessor for the control of the CPC. In addition, the analyzing system can be fitted with a low-cost suite of a micro-computers for data storage, a wireless communication (WiFi) system, a Bluetooth communication to an on-board diagnostics adapter, an HTML driven graphical user interface, and additional systems to allow the system to stand alone for various application. Optionally, the CPC of the analyzing system includes a 3-way solenoid valve to drain the fluid from the CPC condenser periodically.

In one aspect, the analyzing system includes additional components to increase functionality and efficiency, including HEPA filters for filtering dilution and saturator flows, an external tank working fluid tank, microprocessor-controlled pumps, a diffusion screen to increase the system $d_{50}$ to 23 nm, a sampling hose, and a sampling probe. Optionally, the analyzing system includes a second diluter to extend the particle number concentration range to 6,000,000 particles per cubic centimeter (#/cm$^3$). However, concentrations above 250,000 #/cm$^3$ provide reliable indication for defective diesel and gasoline particle filters. An evaporator tube for the removal of the semi-volatile particles may also be included with the analyzing system.

The particle analyzer can be calibrated to fulfill the performance criteria of ISO 27891:2015. However, with the intrinsic linearity and performance predictability of CPC technology, a much-reduced calibration scope could be used, with little or no detrimental effect, to provide a corresponding significant cost reduction. The particle analyzer can also be configured to meet or exceed Swiss PTI performance criteria of the Switzerland Confederation Ordinance on Air Pollution Control (OAPC) 814.318.142.1. SR 814.318.142.1 is the only currently established PTI PN program. The CPC of the analyzing system is configurable to operate with a $d_{10}$-$t_{90}$ response of less than three (3) seconds.

Operational deterioration factors are essentially zero for a well-designed CPC as reflected in ISO 27891 calibration methodology and yearly interval between calibrations. In contrast, diffusion-based PN measurement systems or diffusion chargers (DCs) are typically prone to deteriorate during normal operation from a variety of sources, such as contamination of the trap and corona source. In the typical size range of interest for emission particle concentration analysis, CPCs have no particle size dependency, whereas DCs have a significant size dependency and can exhibit erratic results when the particles are pre-charged (e.g. in Selective Catalytic Reduction (SCR) after treatment systems).

Sample capillaries may be included to measure fluid flows at various components of the analyzing system which reduces or eliminates the need for individual flow calibration. Fluid or gas flowrates determined by the measurement of pressures across a restriction often requires individual calibration. However, the very tight engineering and surface tolerances for low-cost hypodermic needles (i.e. capillaries) provides tight control, without calibration, for flow measurements by pressure drop. Mixing type CPCs are typically configured with at least 3 or 4 of the total 4 flows being measured in real-time (such as the extract flow, the sample flow, the drain flow, and/or the saturator flow). Each flow measurement requires a relatively expensive pressure sensor or pressure transducer. Mixing type CPC's typically measure the sample flow by subtracting from the total exhaust the saturator flow and the drain flow. Such an approach requires very accurate flow calibration of the total exhaust, saturator, and drain flows in order to reduce error in the determined sample flow. Sample capillaries are included with the analyzing system to measure and/or calculate the sample flow, thus reducing or eliminating potential error sources and reducing complexity and cost of the analyzer. Use of a 3-way solenoid valve to drain the CPC may further reduce or eliminate complexity and cost by removing the need to measure the drain flow.

Instead of including a pressure transducer at each point for a measurement, a single pressure transducer or pressure sensor can be used to measure a pressure differential between two pressure sources by cycling each pressure source to determine a pressure differential and then calculate pressures in the system. A first pressure P1 and a second pressure P2 can be determined by measuring a pressure response P with periodic cycling of the sources for either P1 or P2. Pressure response P=P1+P2, thus during normal operation P1=P−P2 and with P1 source turned-off, P2=P.

The single differential pressure transducer, instead of two independent transducers, reduces the complexity of resources required for pressure response measurements because the electronics required to turn off the pressure sources are simpler and cost a fraction of the cost of each complex pressure transducer. The interval between isolating one pressure source and measuring both can be determined and set based on the stability of the pressure signals.

The efficiency of a CPC is determined by the level of super-saturation achieved and the level of super-saturation depends on the temperature difference between the saturator and the condenser. In practice, not all particles of the ambient air experience or reach the same level of super-saturation, thus the efficiency of the optical particle counter gradually decreases at lower levels of super-saturation. The lower levels of super-saturation produce smaller particle sizes that are relatively less likely to be detected by the optical counter. An acceptable lower cut-off size of particles to be analyzed by the optical counter is commonly defined as the particle size at which 50% of particles (d50) present are counted. Typically, the lower cut-off particle size is around 15 nm in diameter. A d50 particle size of 15 nm is smaller than the "automotive—PMP" criteria, which requires measurement of particles no smaller than 23 nm, and thus a higher d50 is necessary when analyzing engine exhaust. Diffusion screens can increase the d50 to an acceptable size.

In one aspect, the analyzing system is configured to verify that it is properly configured. Engines emit significant quantities of carbon dioxide (e.g. an expected concentration in the exhaust gas of 16% by volume from a gasoline engine operating under stoichiometric combustion conditions). If the sampling probe is not inserted fully or correctly into the vehicle tailpipe, the measured carbon dioxide would be lower than expected due to mixing with ambient air. This would potentially cause a "dirty vehicle" that would not pass a properly performed exhaust analysis to pass due to the dilution of the engine exhaust particulate with cleaner ambient air. A carbon dioxide sensor included with the analyzing system provides an anti-cheat device to prevent users from purposely not inserting the sampling probe sufficiently into the vehicle tailpipe in order to "pass" the vehicle In one aspect of the present invention, the CPC is configurable to automatically adjust the reported count of a particle concentration present in the laser measurement zone. This adjustment is termed the "coincidence correction factor". A high particle concentration may disrupt the test and reduce the accuracy of the analyzing system. The higher the particle concentration in the sample flow the higher the probability that more than one grown sample particle droplet is in the laser measurement zone, wherein the optics may "count" only one of the more than one particle in the measurement zone. Resulting in a missed count. As an example, a high particle concentration may be present with a concentration of 30,000 particles per cubic centimeter (#cm$^{-3}$) of fluid volume. Application of an automatic correction allows the CPC to measure up to 30,000 #cm$^{-3}$ with linearity of $R^2$>0.99 and a maximum coincidence correction factor of less than 15%. The CPC has a maximum particle concentration at which it can accurately count particles in a flow, this maximum is referred to as an upper concentration in single count mode (non-diluted). For example, a CPC may have an upper concentration in single count mode of 30,000 #cm$^{-3}$, which may be increased with diffusion screens or dilutors included with the analyzing system.

Therefore, the particle concentration analyzing system of the present invention provides a robust analysis system including a condensation particle counter for performing particle concentration analyses of a sample fluid, such as engine exhaust PTI particle number testing. The particle concentration analyzing system is configurable for use in testing facilities and for use in off-site testing, such as field testing engines. The analyzing system may be used in various environments, including use for vehicle engine exhaust analysis, power plant exhaust analysis, ambient environmental air quality analysis, and other environments. The analyzing system includes a sealed working fluid tank and a safety position switch to prevent damage, misuse, and contamination during testing procedures and during transport of the analyzing system. The analyzing system includes pressure sensors and flow sensors to measure, validate, and calibrate the analyzing system to ensure that tests performed with the analyzing system meet pre-determined quality requirements. A solvent recovery system may be included to recover working fluid from tested fluid flows to reduce working fluid consumption rates to reduce overall fluid consumption and increase the number of test that can be performed without refilling the working fluid in the analyzing system. The analyzing system includes an automatic working fluid refilling system to monitor and refill the working fluid as it is consumed during tests to reduce handling and contamination that may be introduced by manual refilling of the working fluid. Additional features include an evaporator tube to evaporate volatile particles prior to discharge into the ambient environment, ejector dilutors to dilute the concentration of particles in a sample flow to increase efficiency of the optical particle counter, diffusion screens to selectively remove very small particles prior to entry into the condensation particle counter, and precision capillaries for simple, low-cost flow validation.

These and other objects, advantages, purposes, and features of the present invention will become more apparent upon review of the following specification in conjunction with the drawings.

BRIEF DESCRIPTION OF THE DRAWINGS

FIG. 5 is a cross-sectional view of a capillary flow monitor for monitoring system flow in a particle concentration analyzing system;

FIG. 6 is a cross-sectional view of a three way solenoid for drainage of a particle concentration analyzing system;

FIG. 6a is a detail view of the 3-way solenoid valve of FIG. 6 in a "normally open" configuration;

FIG. 6b is a detail view of the 3-way solenoid valve of FIG. 6 in a "normally closed" configuration;

DESCRIPTION OF THE PREFERRED EMBODIMENTS

Figure 1:
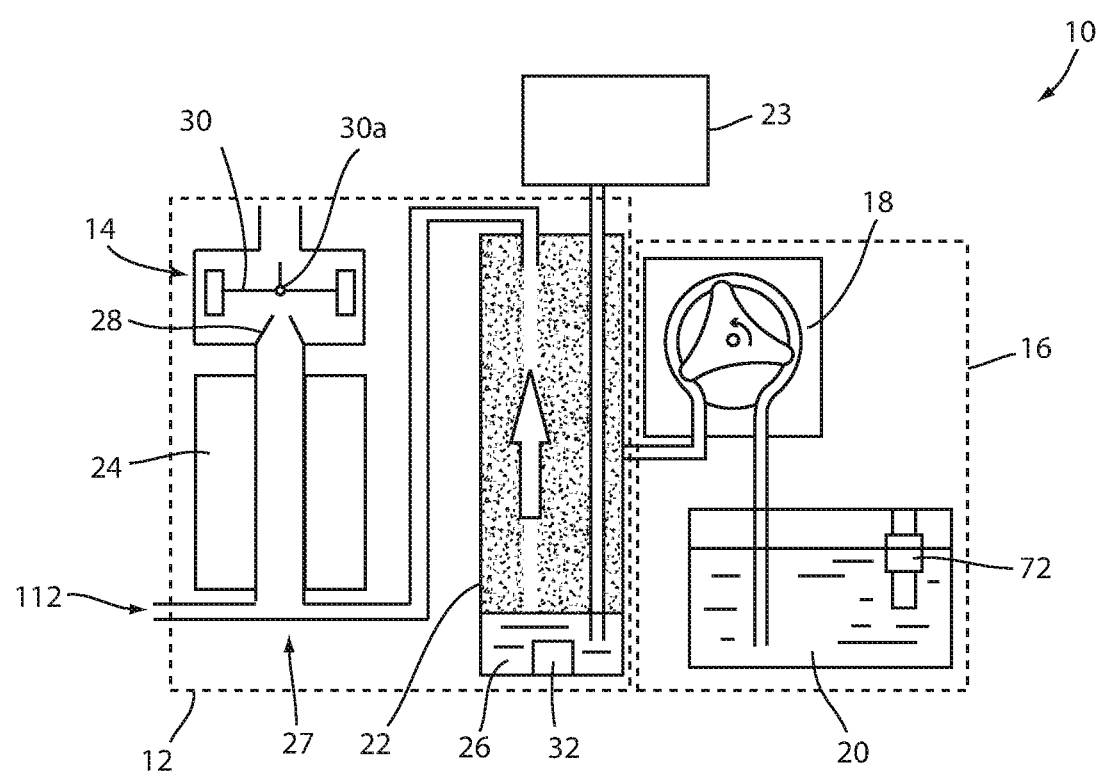
FIG. 1 is a diagram of a particle concentration analyzing system in accordance with the present invention.

Referring now to the drawings and the illustrative embodiments depicted therein, a system for analyzing particle concentration 10 in a fluid, including a condensation particle counter (CPC) 12, is provided to analyze a sample fluid or aerosol to determine a particle concentration or particle number in the sample (FIG. 1). The analyzing system 10 may be adapted to analyze various forms of fluid or aerosol samples, including engine exhaust, environmental atmosphere, power production exhaust, or the like, including for periodic technical inspections (PTI). The analyzing system 10 is configured to operate with a working fluid, such as isopropyl alcohol (IPA) to supersaturate an ambient air flow. The saturated ambient air flow is mixed with a sample air and then the mixture of ambient air and sample air pass through a condenser where the supersaturated ambient air condenses onto particles in the sample air flow to grow the particles in the sample air flow to make them visible by an optical particle counter. The analyzing system 10 includes a working fluid fill or refill system 16 for monitoring and automatically filling or refilling the working fluid in the analyzing system 10. The working fluid fill system 16 includes a pump 18 for filling and maintaining a sufficiently full level of working fluid in the analyzing system 10. A working fluid tank 20 is included with the particle analyzing system 10 to provide a source of working fluid to the analyzing system 10. The analyzing system 10 may be adapted for use in a testing facility where a trained operator can monitor and maintain the system 10. Optionally, the analyzing system 10 may be adapted for portable use as a self-contained, portable, and robust particle analyzing system 10a, such as field testing of farm equipment (see FIGS. 4 and 9).

The CPC 12 is configured to operate with a working fluid, such as isopropyl alcohol (IPA) to supersaturate an ambient air flow. In the illustrated embodiment of FIG. 1, the CPC 12 is a mixing type CPC, such that the ambient air flow is super-saturated with the working fluid in a saturator block or fluid saturation chamber 22, independent of a sample fluid (e.g. engine exhaust). After supersaturation is achieved, the saturated ambient air is mixed with the sample flow of fluid, air, or aerosol, between the saturator block 22 and a condenser 24. The saturated ambient air flow and sample air flow may be mixed in a mixing chamber 25 upstream of the condenser 24, in the condenser 24, or at a mixing junction 27 of the saturated flow and the sample flow. The mixture of the ambient air flow and the sample air flow then pass through the condenser 24 where the supersaturated ambient air condenses onto particles in the sample air flow to grow the sample air particles to make them visible to the optical particle counter 14. The condensation of the saturated ambient air onto the sample air particles causes the sample air particles to grow into larger droplets, such as droplets that are 5-10 micrometers (μm) in size. A fluid or air filter 23, such as a HEPA filter, may be included with the analyzing system 10 upstream of the saturator 22 to filter unwanted particles from the ambient air, such unwanted particles might interfere with the results of the analysis.

The grown particles are focused or passed through a nozzle 28 having a wide end at or near an entrance side 14a of the optical particle counter 14 and a narrower end proximate the laser beam 30. The nozzle 28 directs the grown particle flow in a substantially uniform flow through the optical field of the laser beam 30 and optical counter 14. The optical counter 14 counts the grown particles as the particles flow by the laser 30 by utilizing light scattering properties, such as with pulse detection electronics, to determine the number of sample air particles present in the sample fluid flow. After passing the laser 30 and optical particle counter 14, the analyzed fluid flow is exhausted from an exhaust side 14b of the optical counter 14.

Figure 2:
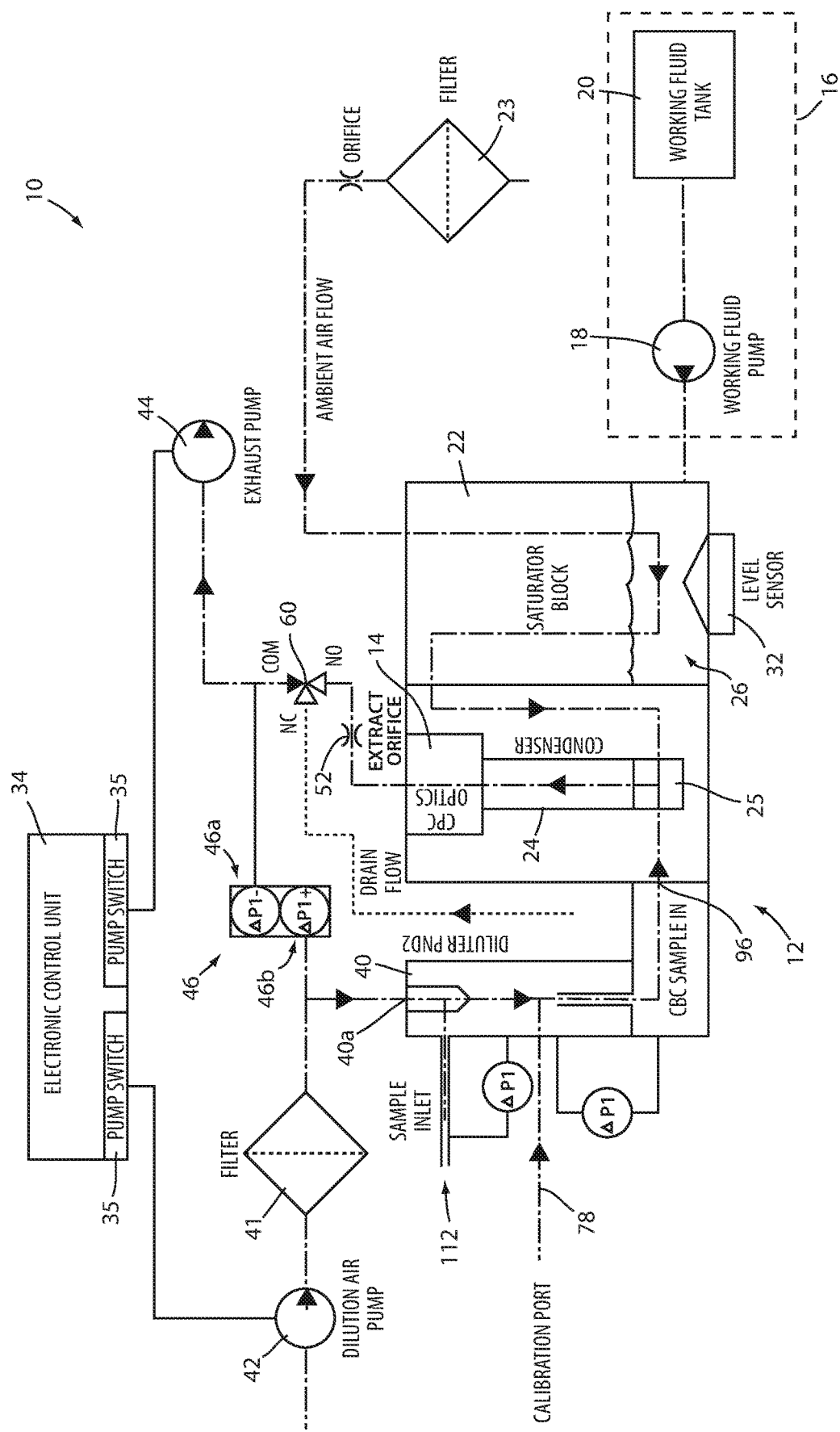
FIG. 2 is a flow diagram of a particle concentration analyzing system in accordance with the present invention.

In the illustrated embodiments of FIGS. 1 and 2, the particle analyzing system 10 includes an automatic working fluid fill system 16 to automatically monitor and refill working fluid in the saturator 22 as it is depleted during saturation of the HEPA filtered ambient air flow. The fluid fill system 16 includes a working fluid pump 18 and a working fluid tank 20. The pump 18 draws working fluid from the working fluid tank 20 and pumps it into a reservoir portion 26 of the saturator block 22. As depicted in the illustrative embodiment of FIG. 1, the pump 18 is provided in the form of a peristaltic pump as commonly known for metering of fluids and controlling flow of a fluid through a tube in a bi-directional manner. A reservoir fluid level sensor 32 is disposed at the reservoir portion 26 to monitor the level of working fluid in the saturator 22. The fluid level sensor 32 is in electronic communication with the pump 18 to maintain a sufficient level of working fluid in the saturator 22 to ensure proper operation of the analyzing system 10. The automatic fill system 16 mitigates fluid handling by a technician and reduces incidence of contamination of the working fluid.

The analyzing system 10 may include an electronic controller 34 in communication with the pump 18 and the fluid level sensor 32 that controls the pump 18 based on information received from the fluid level sensor 32. The controller 34 includes software adapted to control the analyzing system 10. Embedded computers may be provided with the software controller 34 to facilitate integration of web-based wireless communications, graphical user interfaces, or third party devices (e.g. Bluetooth on-board diagnostics, or USB based GPS modules) with the analyzing system 10 to control or monitor the system 10. The electronic controller includes switches 35 to selectively operate different pumps in the analyzing system 10.

The working fluid tank 20 requires periodic refilling and or replacement during normal use of the CPC 12 and analyzing system 10. The working fluid may be hydroscopic and flammable, such that safe handling of the working fluid is important. The working fluid tank 20 may be sealed, such as with a self-sealable cap (e.g. with a septum), such that it does not spill if tipped over and such that the hydroscopic working fluid in the tank 20 is not exposed to water vapor that could contaminate the working fluid. When the sealed tank 20 is removed, the self-sealing cap (not shown) contains the fluid in the tank 20 and mitigates contamination and safety issues. Optionally, as described in further detail below, the working fluid tank 20 may include a molecular sieve to remove water from the working fluid.

Figure 4:
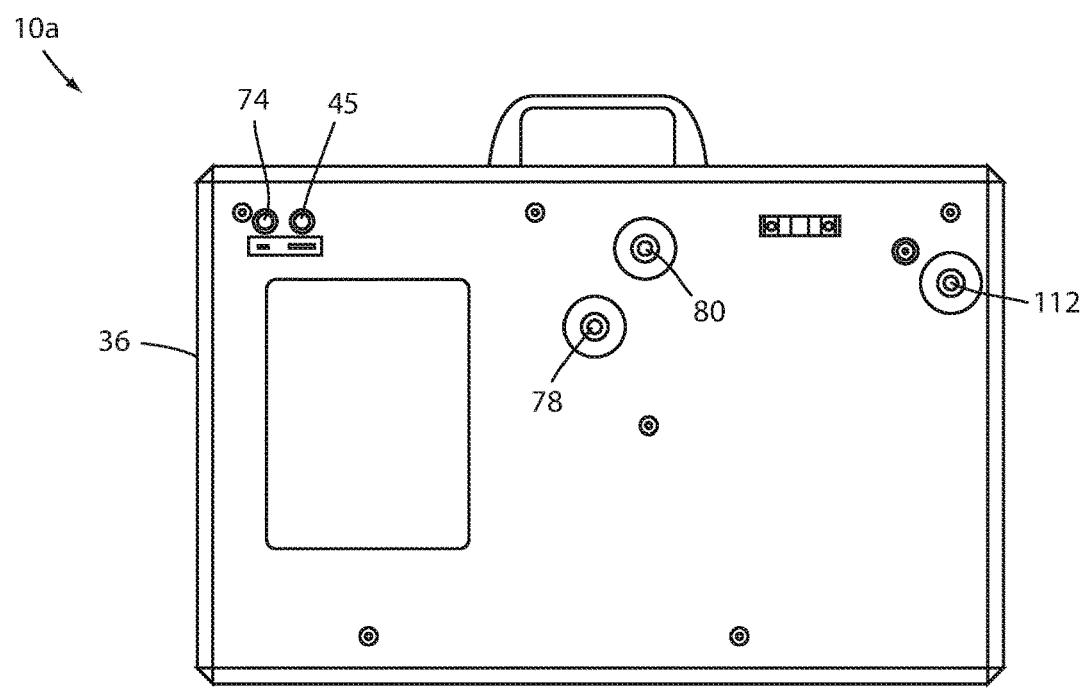
FIG. 4 is a front elevation view of the particle concentration analyzing system in accordance with the present invention.
Figure 9:
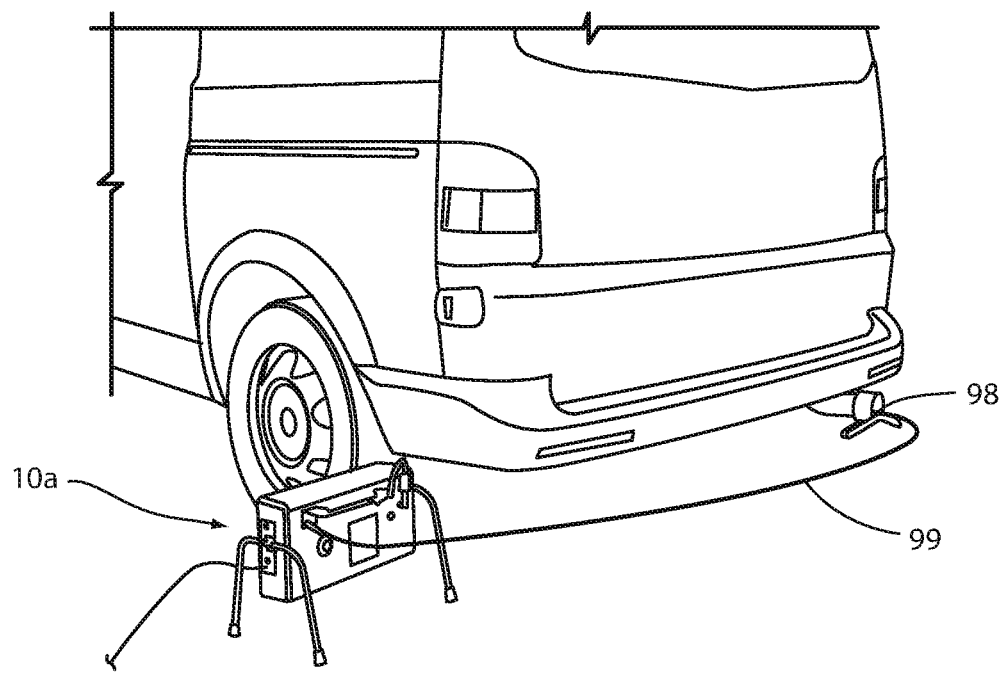
FIG. 9 is a perspective view of a particle concentration analyzing system in accordance with the present invention prepared for testing emissions of a vehicle.
Figure 10:
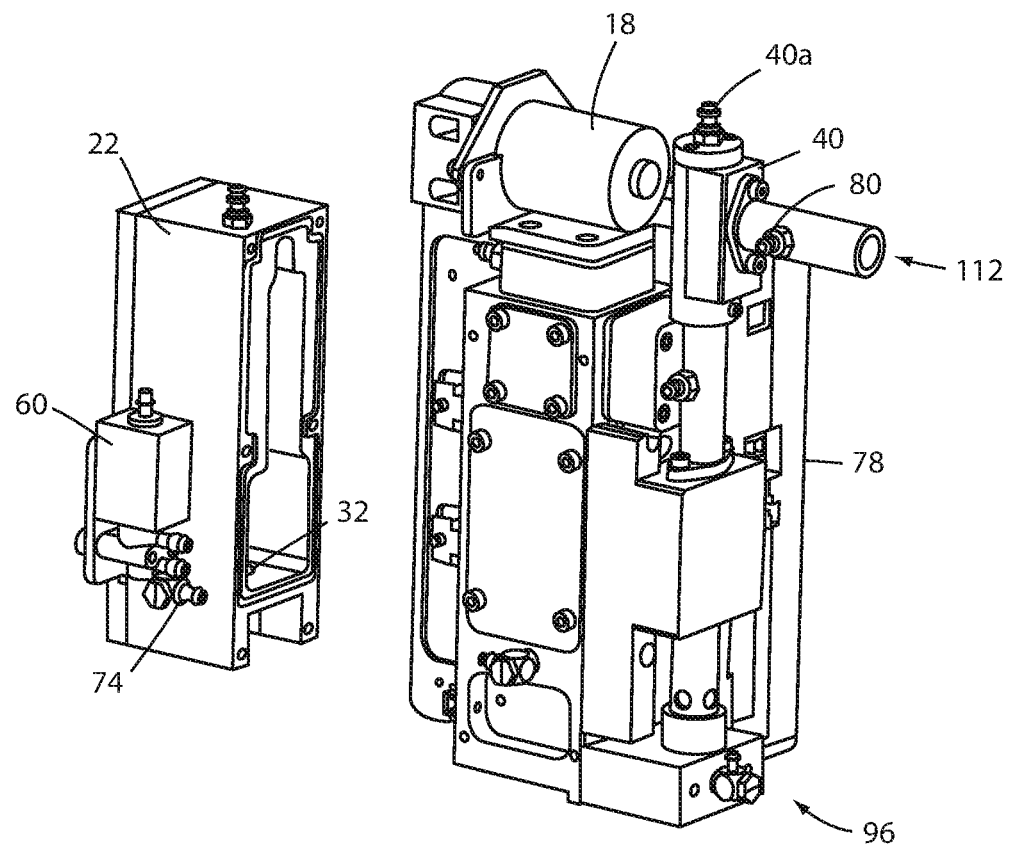
FIG. 10 is an exploded perspective view of a particle concentration analyzing system in accordance with the present invention.
Figure 11:
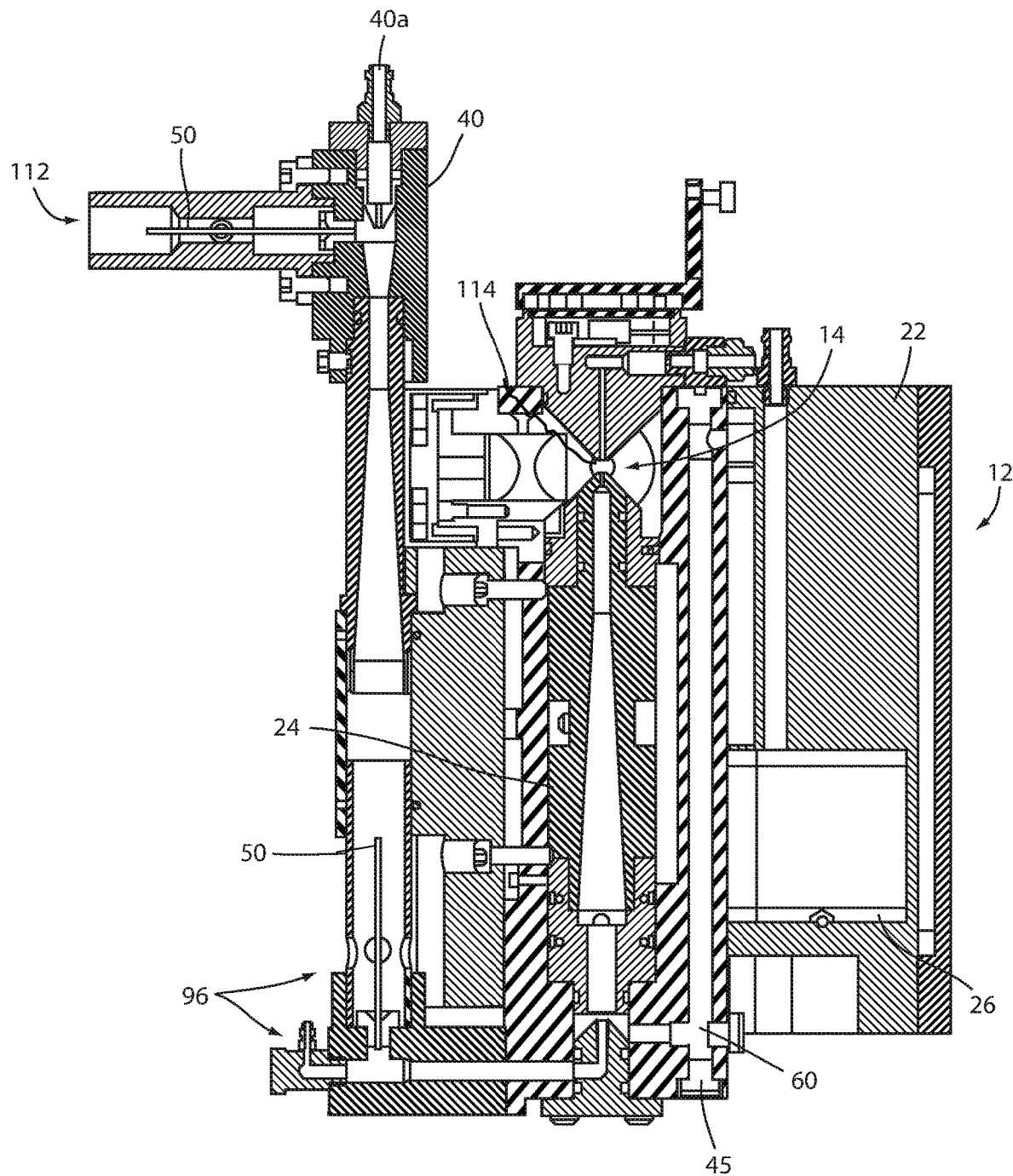
FIG. 11 is a cross-sectional view of a particle concentration analyzing system in accordance with the present invention.
Figure 11A:
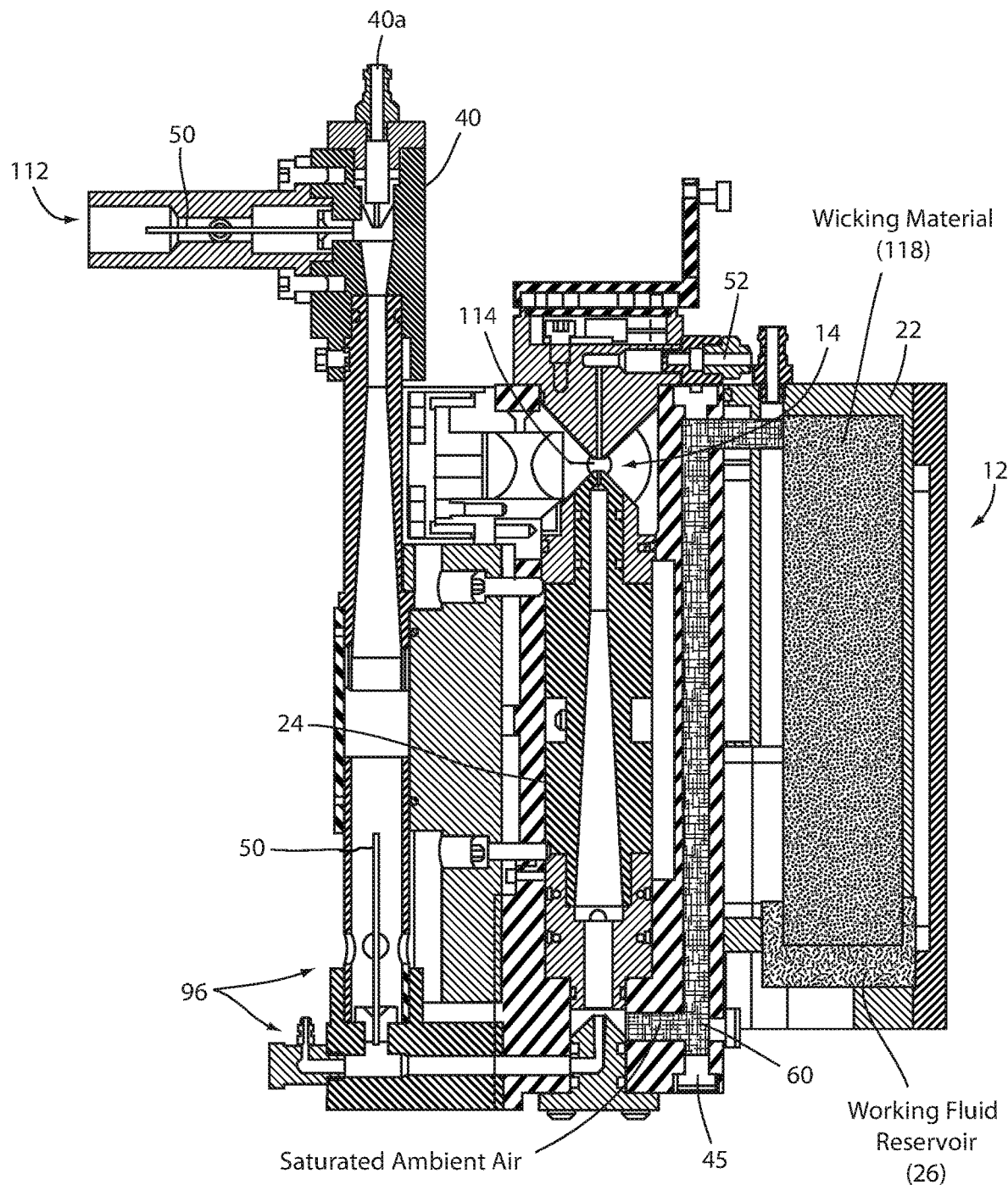
FIG. 11A is another cross-sectional view of the particle concentration analyzing system of FIG. 11, depicting components and contents of a saturator of the particle concentration analyzing system.

The working fluid tank 20 and working fluid pump 18 are in fluid communication with the CPC 12. The fluid tank 20 and fluid pump 18 may be spaced away from the CPC 12. The tank 20 and pump 18 may be disconnected from the CPC 12 to be replaced or refilled. Optionally, the working fluid pump 18 is coupled to the saturator block 22 and the working fluid tank 20 is spaced away from the working fluid pump 18 such that the tank 20 may be disconnected from the pump 18 to be replaced or refilled. In another embodiment, a housing 36 contains and supports the CPC 12 and the fluid fill system 16 to provide a self-contained analyzing system 10a (FIGS. 4 and 9). The working fluid tank 20 of system 10a may be removed from the system to be refilled or replaced. Optionally, the working fluid tank 20 of system 10a may be refilled from an external tank, such that removal from the housing 36 is unnecessary.

In one embodiment, the working fluid used in the analyzing system 10 is greater than 99% isopropyl alcohol (IPA). Other fluids may be used for the working fluid, such as n-butanol. The working fluid is required to be maintained at a high purity (e.g. greater than 99% pure). Impurities (e.g. water) in the working fluid can change the vapor pressure/temperature relationship and cause inaccurate readings from the analyzing system 10. The amount and purity of the IPA vapor generated in the saturator 22 is critical for stable and accurate measurements. Isopropyl alcohol, n-butanol, and other working fluids are hydroscopic and thus can absorb water over time which decreases analysis efficiency of the analyzing system 10. The working fluid tank 20 can be supplied with a water absorbing material (not shown) to prevent or eliminate contamination or deterioration of the working fluid. The water absorbing material in the working fluid tank 20 may be a 3A molecular sieve in the tank 20 to remove any water contamination from the ambient air prior to entering the saturator 22 and thus extend the fluid working lifetime.

Under normal operation of the analyzing system 10, the working fluid consumption rate may be 1-2 ml per hour. As illustrated, the saturator block reservoir 26 has a capacity of 10 ml of liquid working fluid. Due to the low rate of consumption of working fluid, the analyzing system 10 is capable of operating over an extended period without the need to refill or replace the working fluid tank 20. The working fluid consumption rate of 1-2 ml per hour yields between about five (5) and ten (10) hours of continuous operation. For example, for a five (5) minute PTI test, about 60-120 PTI tests could be performed without refiling the saturator block reservoir 26. The working fluid tank 20 extends the operation duration of the analyzer up to several months and the capacity of the working fluid tank 20 may be selected to accommodate shorter or longer testing periods.

In one embodiment, the analyzing system 10 includes at least one diffusion screen (not shown) upstream of the CPC 12 to improve test outcome quality. Diffusion screens upstream of the CPC 12 are included to increase the analyzing system 10 response to the currently established "automotive—PMP" criteria of 23 nm. The number of diffusion screens required can be selected to meet different d50 cut-off points.

The CPC 12 may be configured to automatically adjust the reported count of a particle concentration present in the laser measurement zone 30a. The adjustment ("coincidence correction factor") allows the optical counter 14 to count particles accurately even when the concentration of particles in the sample fluid are high. Without supplemental dilution means, and utilizing a coincidence correction factor, the CPC 12 is capable of calibrated and validated analysis up to 30,000 $\#cm^{-3}$, representing an upper concentration in single count mode (non-diluted) for the analyzing system 10.

In the illustrated embodiment of FIG. 2, the analyzing system includes a dilution system, having an ejector diluter 40, to facilitate single particle counting to concentrations of up to about 600,000 #cm-3. The dilution system includes a pump 42 is included upstream of the ejector dilutor 40 to provide dilution air flow to the ejector dilutor 40 through a dilutor input 40a. The ejector diluter 40 is configurable to dilute the sample flow of fluid nominally to a 20:1 dilution ratio. The ejector dilutor 40 may be adjustable to modify the dilution ration. The ejector dilutor 40 is also capable of overcoming humidity issues associated with testing vehicles and engines that emit high concentrations of water vapor (e.g. gasoline engines) by mixing the sample flow with ambient filtered dilution air. Optionally, for testing above particle concentrations of about 600,000 #cm-3, an additional ejector diluter (not shown) can be fitted with the analyzing system 10. For example, an additional dilution ejector dilutor having a dilution ration of 10:1 can extend the upper concentration limit of the analyzing system 10 to 6,000,000 #cm-3. A filter 41, such as a HEPA filter, may be provided with the ejector dilutor 40 to filter ambient air prior to entering the ejector dilutor 40.

Critical flows and pressures for the ejector dilutor 40 and additional ejector dilutors are monitored and controlled by the controller 34. Optionally, the ejector dilutor 40 is coupled to an exterior portion of the CPC 12 and provides cooling to the CPC 12 block via heat transfer from the CPC 12 block to the ejector dilutor 40. In one embodiment, the ejector dilutor 40 is integrated with the CPC, such that a mechanical pneumatic circuit (not shown) of the dilutor 40 is fully constrained and thus requires no unique verification for particle losses.

The analyzing system 10 may include an evaporator tube (not shown) for the removal of semi-volatile particles in the sample flow prior to the sample flow mixing with the saturated flow and entering the condenser 24. The evaporator is operated at about 300° C. and is capable of semi-volatile particle removal efficiency of greater than 95%, such as removal efficiency of tetracontane of greater than 95%. The analyzing system 10 can be operated with the evaporator in an active or disabled configuration, which, for example, facilitates investigations of the likelihood of reporting a false vehicle PTI failure caused by the intermittent release of semi-volatile nano-particles by the vehicle or engine during testing. When the analyzing system 10 is configured with an additional ejector diluter and the evaporator tube, the analyzing system 10 meets Swiss PTI performance criteria of the Switzerland Confederation Ordinance on Air Pollution Control (OAPC) 814.318.142.1.

An exhaust or extract pump 44 is included with the analyzing system 10 to draw fluid away from the CPC 12 after the fluid has been analyzed at the optical sensor 14. The extract pump 44 may be connected to a drain port 45 of the condenser 24 to drain the CPC 12 as required. The extract pump is in electronic communication with the electronic controller 34 and is operable to turn on and off to exhaust the CPC 12, to supplement fluid flow in the analyzing system 10, to drain the analyzing system 10, or to measure pressure values at various components of the analyzing system 10.

The analyzing system 10 includes at least one differential pressure sensor or pressure transducer to measure two independent pressures and determine each individual pressure by periodically controlling the source of the pressure (e.g. turning a pump on or off). The analyzing system 10 of the illustrated embodiment of FIG. 2 includes a differential pressure sensor 46 having two pressure measuring ports 46a and 46b. The two independent pressures, P1 and P2, can be determined by measuring a pressure response (P) with periodic cycling of the sources for either P1 or P2. Pressure response P=P1+P2, thus during normal operation P1=P-P2 and with P1 source turned-off, P2=P. The differential pressure sensor 46 reduces the complexity of resources required for pressure response measurements because the electronics 34 required to turn off the dilution pump 42 or the exhaust pump 44 are simpler and cost a fraction of the cost of a complex pressure transducer. The interval between isolating one pressure source and measuring both can be determined and set by the stability of the pressure signals.

With reference to FIG. 2, the pressure sensor 46 measures a negative pressure caused by the exhaust pump 44 and a positive pressure caused by the dilution air pump 42. The pumps 42, 44 are controlled using the pump controller electronics 34. Under normal operation, the pressure sensor 46 reports the total pressure difference between the two sources, the dilution pump 42 and the exhaust pump 44. When the dilution air pump 42 is periodically turned off by the controller 34, the pressure reported is only the pressure caused by the exhaust pump 44. The difference can be used to determine or calculate the dilution air pump pressure under normal operation.

In the illustrated embodiment of FIG. 5, a flow measurement device or differential pressure sensor 48 having a precision capillary 50 is included for flow measurements to reduce or eliminate the need for individual flow calibration in the various flow paths of the analyzing system 10. Individual flow calibrations may be required when gas flowrates are determined by the measurement of pressures across a restriction, such as an extract orifice 52. Precision manufactured capillaries 50, such as hypodermic needles, are manufactured to tight engineering and surfaces tolerances and provide tight control tolerances for flow measurements by pressure drop, without the need for calibration. A flow rate 54 determined by a capillary is shown in FIG. 5 with the corresponding differential pressure drop.

The sample flow (e.g. engine exhaust) to be analyzed by the analyzing system 10 is measured directly by a sample differential pressure sensor 56 including a sample flow precision capillary 58. The sample flow can be calculated directly using the sample capillary 58 of the sample sensor 56, thereby reducing potential error sources and reducing complexity and costs of the analyzing system 10.

As illustrated in FIGS. 2 and 6, a 3-way solenoid valve 60 is included to regulate fluid flows in the analyzing system 10, and may be adapted to drain the CPC 12 of the analyzing system 10, such as from a drain 45 at the condenser 24. The 3-way valve 60 eliminates the need for a real-time measurement of the drain flow. The 3-way solenoid valve 60 is selectively operable to periodically drain fluid from the condenser 24 (FIG. 6). The 3-way solenoid 60 is controlled by the controller 34 to periodically switch the flow path from a "normally open" position 60a to a "normally closed" position 60b (see FIGS. 6A and 6B). The 3-way solenoid valve 60 includes fluid connections to the drain port 45 of the CPC 12, the extract orifice 52, and to the extract pump 44.

Figure 7:
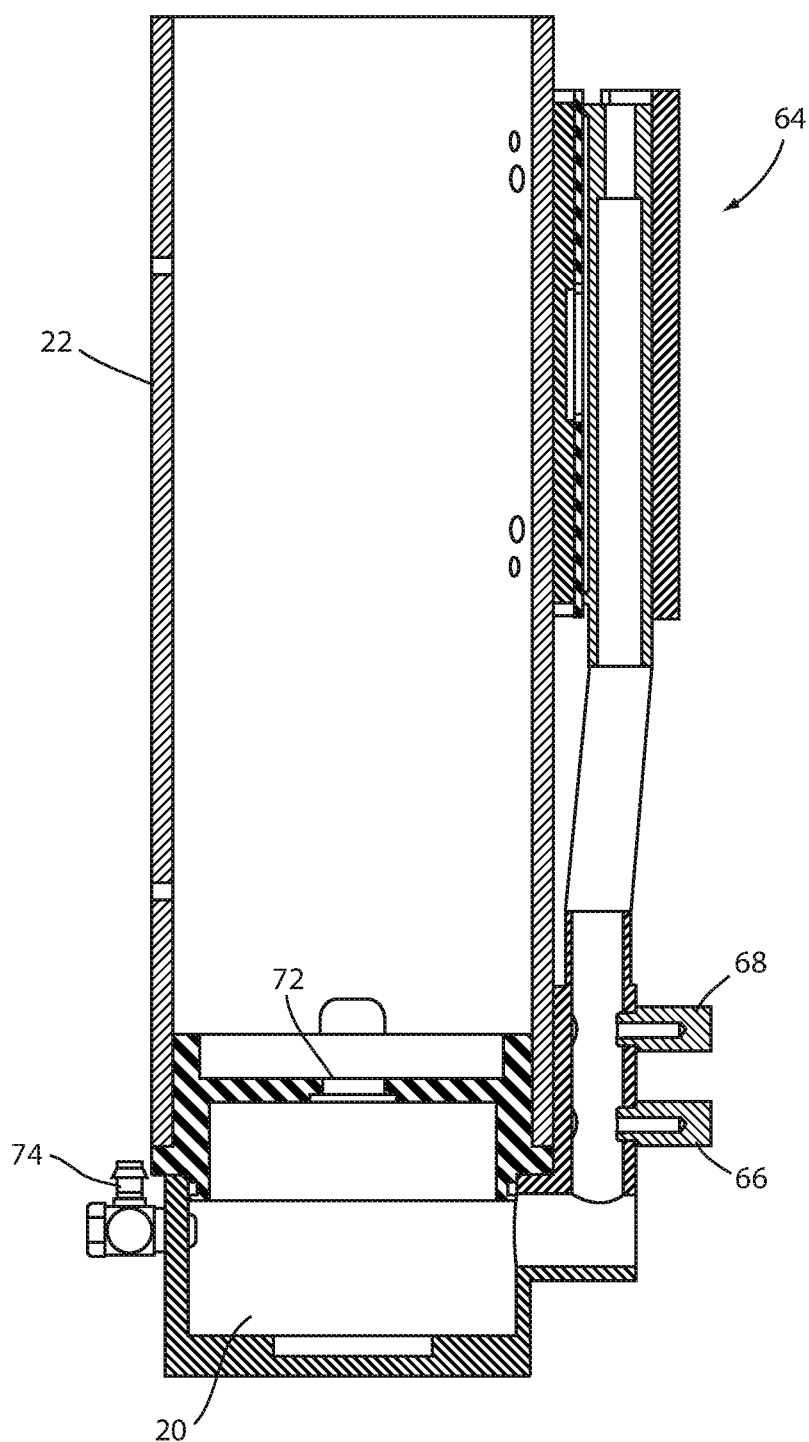
FIG. 7 is a cross-sectional view of a cooled solvent recovery system for recovery of working fluid in a particle concentration analyzing system.

The extract and drain flows from the CPC 12 contain working fluid in both the gaseous and liquid phases. In the illustrated embodiment of FIG. 7, the analyzing system 10 includes a solvent or working fluid recovery system 64 to recover the gaseous and liquid phase working fluid from the extract and drain flows. The recovery system 64 is coupled with the working fluid tank 20 to return recovered working fluid to the working fluid tank 20 to be reused in the analyzing system 10. The exhaust pump 44 pumps the extract and drain flows to a recovery inlet port 66 of the solvent recovery system 64. The recovery system 64 includes a vent 68 that is configured to vent vapor or gas from the recovery system 64 and also from the working fluid tank 20. The recovery system 64 reduces the concentration of the vapor being released through the vent 68 to recover some of the working fluid and reduce the overall working fluid consumption rate. As illustrated in FIG. 7, the solvent recovery system 64 includes a cooled heat exchanger 70, such as a Peltier device, to condense the working fluid vapor inside the solvent recovery system 64, the condensed working fluid falls back and is directed to return to the working fluid tank 20 by gravity.

The analyzing system 10 illustrated in FIG. 7 includes a working fluid tank level sensor 72 for monitoring the level of working fluid in the working fluid tank 20 and a working tank fill port 74 to refill the working fluid tank 20. The tank sensor 72 communicates the level of working fluid in the tank 20 to the controller 34, which may then control the working fluid pump 18 to refill the working fluid tank 20 by drawing fluid from an external fluid tank (not shown) to the working fluid tank 20. Optionally, the controller 34 may provide a signal or alert to an operator that the working fluid tank 20 needs to be refilled. A drain port 76 included with the analyzing system 10 allows a user to drain the working fluid tank 20, such as for cleaning or transportation of the system 10.

Figure 3:
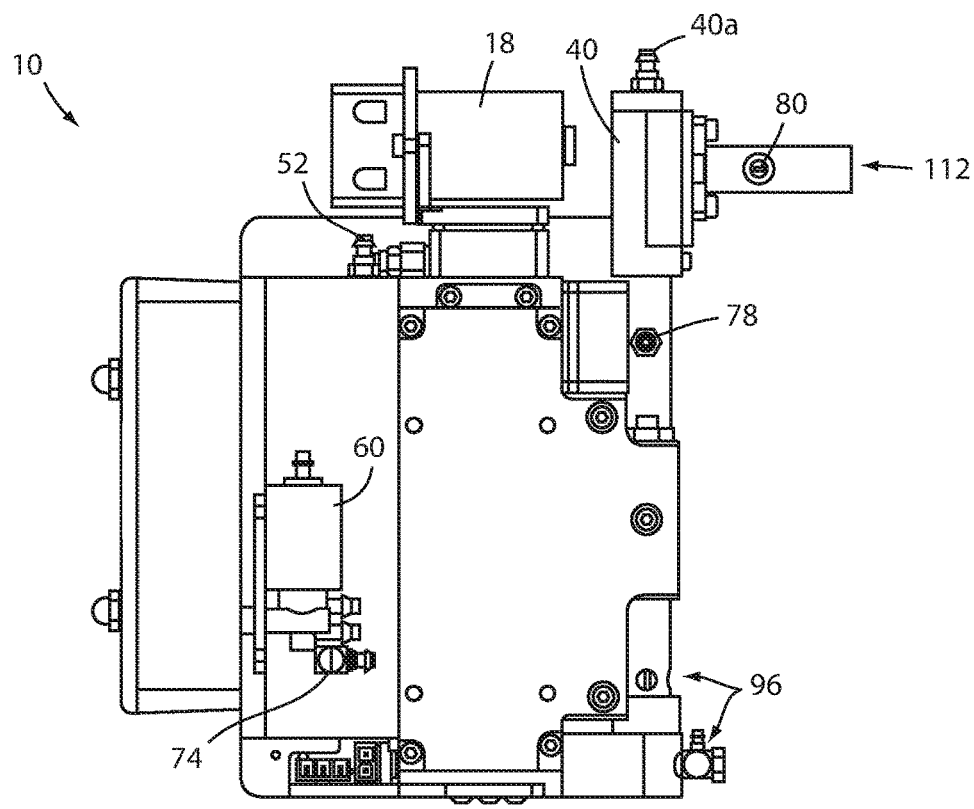
FIG. 3 is a rear elevation view of a particle concentration analyzing system in accordance with the present invention.
Figure 8:
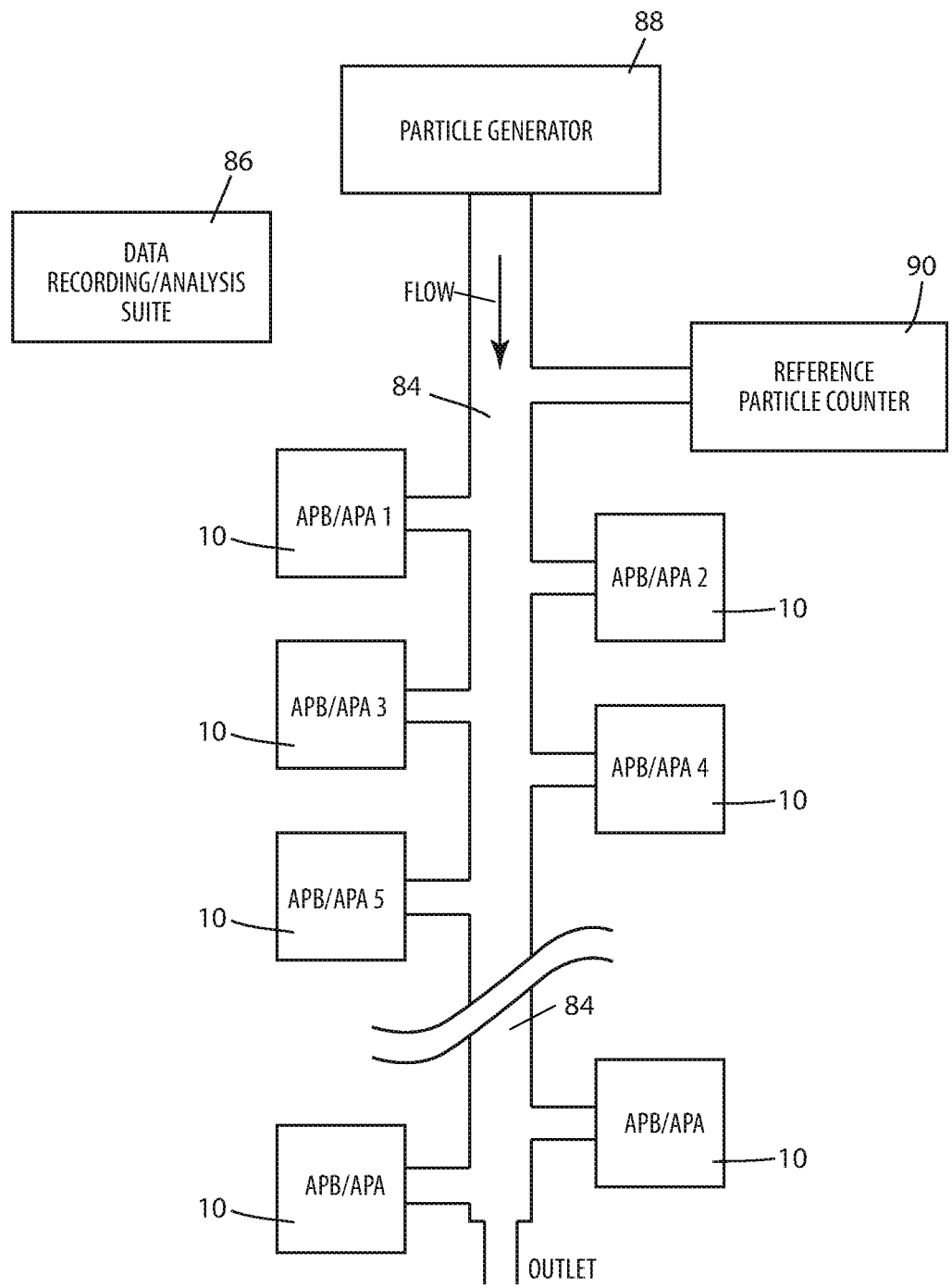
FIG. 8 is a flow diagram illustrating calibration of a particle concentration analyzing system.

As shown in the illustrated embodiments of FIGS. 3-4, the analyzing systems 10 and 10a include selectable calibration ports 78, 80 to facilitate manual or automatic calibration of the various components in the analyzing system 10 without internal instrument access or dismantling or disassembly of the analyzing system 10. Selectable port 78 is configured for CPC 12 calibration and selectable port 80 is configured for combined calibration of the CPC 12 and ejector diluter 40. Calibration of the analyzing system 10 is performed by introducing an aerosol or fluid having a known reference particle number and size. Selectable ports 78, 80 can be connected to a calibration system 82 configured to determine the state of calibration of the analyzing system 10 and to calibrate a miss-calibrated analyzing system 10 (FIG. 8).

Calibration system 82 includes a calibration manifold 84, a controllable data management analysis software system 86, a reference particle generator or source 88, and a reference particle counting device 90. The data management system 86 is in electronic communication with the reference particle generator 88 and the reference particle counting device 90. The calibration manifold 84 is coupled to either selectable port 78, 80 of one or more analyzing systems 10. Each analyzing system 10 coupled to the calibration system 82 is in electronic communication with the data management system 86. The calibration system 82 is controlled by the data management system 86 to calibrate or validate the analyzing system 10. The reference particle generator 88 generates a calibration fluid flow having a uniform particle number and particle size. The reference particle counter 90 analyzes the calibration fluid flow to determine the uniform particle number and particle size being generated by the particle generator 88. The calibration system 82 and calibration manifold 84 may be configured to calibrate or validate multiple devices or systems 10 in parallel utilizing one reference particle generator 88 and one reference particle counting device 90.

The analyzing system 10 includes a gas sensor system 92 for flow calibration or verification. The gas sensor system 92 is capable of providing flow, measurement, calibration, and verification by determining a number of particles in a reference flow of a reference gas having a known particle density in parts per million. The gas sensor system 92 includes a gas sensor 94 to facilitate a check of the system flows. The gas sensor 94 has a parts per million (ppm) measurement range, such as between 0-10,000 ppm. In an exemplary embodiment, a known concentration of carbon dioxide is introduced as a reference gas into the analyzing system 10 through a reference gas inlet or input port 96. The particles in the reference gas are mixed or diluted with dilution air from the ejector dilutor 40 and then further diluted or mixed with saturated air from the CPC saturator 22. The concentration of the reference gas can be measured at the exhaust of the ejector diluter 40 or at the CPC exhaust 52 and the measured concentrations can be calculated with the known concentration of the reference gas to validate the dilution ratios and the flows of the analyzing system 10. For example, if a reference carbon dioxide gas having a known concentration of 10,000 ppm is introduced into the system through the input 96 and passes through the ejector diluter 40, which is reporting a dilution ratio of 20:1 as measured, calculated and reported by the system electronics module 34, the concentration at the exhaust of the ejector diluter 40 should be 500 ppm (10,000 ppm÷20). At the exhaust outlet of the CPC 52, the concentration of carbon dioxide would be further reduced by the ratio of the CPC sample flow rate 54 divided by the saturator flow rate as it enters the CPC saturator 22. If the measured concentration with the CO2 sensor 94 is within a pre-determined margin (e.g. <5%) of the expected carbon dioxide concentrations at the ejector dilutor 40 exhaust or the CPC exhaust 52, the flows and the analyzing system 10 are validated.

The Carbon Dioxide sensor 94 may be adapted to verify that the analyzing system 10 is properly configured by checking that a sampling probe 98 inserted into the engine (e.g. into an exhaust pipe of a vehicle) is inserted correctly (see FIG. 9). The sampling probe 98 connects to the analyzing system 10 via a sampling line or hose 99 at a sample line vacuum input port 112 and collects or receives a sample fluid (e.g. engine exhaust) from a source, such as an exhaust pipe. The sampling probe 98 is detachable from the analyzing system 10, such that the analyzing system 10 is capable of receiving a sample fluid directly through the sample input port 112. Engines emit significant quantities of carbon dioxide (e.g. 16% by volume from a gasoline engine operating under stoichiometric combustion conditions). If the sampling probe 98 is not inserted fully or correctly into the vehicle tailpipe, the measured carbon dioxide would be lower than expected due to mixing with ambient air. This would potentially cause a "dirty vehicle" that would not pass a properly performed exhaust analysis to pass due to the dilution of the engine exhaust particulate with cleaner ambient air. The carbon dioxide sensor 94 provides an anti-cheat device to prevent users from purposely not inserting the sampling probe 98 sufficiently into the vehicle tailpipe in order to "pass" the vehicle. The concentration of carbon dioxide measured by the carbon dioxide sensor 94 can be compared with the expected gas concentration (e.g. 16%) to verify that the sample probe 98 is properly inserted into the exhaust pipe and not receiving a diluted exhaust sample.

The optical particle counter 14 in the CPC 12 includes an optics chamber 114 having lenses (not shown) and a laser diode light source 30a. Due to use of a working fluid in the analyzing system 10 to grow the particles prior to them being counted in the particle counter 14, the working fluid may unwantedly migrate or be transported into the optics chamber 114 which could result in the optics being contaminated. Tipping or miss-orientation of the analyzing system 10 may allow working fluid to be pumped or transported to the optics chamber 114 while the analyzing system 10 is turned on. A safety or tip-over protection unit 116 is included with the analyzing system 10. The safety unit 116 includes a three-axis capacitive micro machined accelerometer (e.g. NMA8451 from NXP Semiconductors) (not shown). The safety unit 116 communicates with the electronic controller 34 and the output from the accelerometer is sent to the controller 34, which converts or calculates an instrument tilt angle. If the calculated angle is larger than a pre-determined safe angle or designed orientation, the controller 34 triggers a "protect mode" and turns off the pumps 18, 42, and 44. A safe angle of operation may be up to forty degrees from a vertical axis in any direction. The protect mode prevents damage and potentially costly repairs to the analyzing system 10.

The condition or purity of the working fluid is critical to the proper operation of the analyzing system 10. Contamination or improper filling may degrade or render useless the working fluid in the analyzing system 10, such as by filling the working fluid tank 20 with a wrong fluid. In such a situation, the level sensors, either the reservoir fluid level sensor 32 or the working fluid tank liquid level sensor 72, could still report that the analyzing system 10 is ready for operation. Operating the analyzing system 10 with contaminated or wrong working fluid can cause damage to the various components of the analyzing system 10. The analyzing system 10 may be configured to verify that it is properly configured by monitoring and controlling the condition of the working fluid, such as by measuring the concentration of the working fluid in the extract flow with a gas purity sensor 48 disposed proximate the extract orifice 52 or providing a sealed tamperproof working fluid tank 20 or providing a sealed tamperproof bottle for an external refill container used to refill the working fluid tank 20, as well as other contemplated options.

The saturator 22 of the CPC 12 includes a saturation material or wick 118 filling an interior void of the saturator 22. The wick 118 absorbs working fluid from the working fluid reservoir 26, such that ambient air flowing through the saturator 22 passes through the wick 118 and the absorbed working fluid is available to saturate the ambient air in the saturator 22. The wick 118 provides increased efficiency during the saturation process to provide a higher level of super-saturation to the ambient air.

Changes and modifications in the specifically described embodiments can be carried out without departing from the principles of the present invention, which is intended to be limited only by scope of the appended claims, as interpreted according to the principles of patent law, including the doctrine of equivalents.

The embodiments of the invention in which an exclusive property or privilege is claimed are defined as follows:

1. A particle concentration analyzing system adapted to count a particle concentration in a sample fluid, comprising:
 a working fluid tank adapted to contain a working fluid;
 a sample fluid input configured to receive the sample fluid to be analyzed;
 a condensation particle counter comprising a fluid saturation chamber configured to saturate an ambient air with the working fluid, a condenser configured to condense the working fluid saturated ambient air from said fluid saturation chamber onto the sample fluid, and an optical particle counter configured to count sample particles present in the sample fluid;
 a working fluid pump adapted to transfer the working fluid from said working fluid tank to said fluid saturation chamber;
 a fluid level sensor disposed inside said fluid saturation chamber; and
 an electronic control unit responsive to said optical particle counter to count sample particles present in the sample fluid, and said electronic control unit responsive to said fluid level sensor to control said working fluid pump to automatically fill said fluid saturation chamber with working fluid in response to information from said fluid level sensor regarding working fluid level in said fluid saturation chamber;
 a sampling probe for insertion into a vehicle exhaust pipe and a sampling line coupled at one end to said sampling probe and removably coupled at an opposite end to said sample fluid input upstream of said condenser, said sampling line is in fluid communication with said sample fluid input and said sampling probe; and
 an anti-cheat device, said anti-cheat device comprises a carbon dioxide concentration sensor adapted to measure a concentration of carbon dioxide present in the sample fluid, said anti-cheat device adapted to compare the measured carbon dioxide concentration to an expected carbon dioxide concentration and verify, based on the compared concentrations, that said sampling probe is properly inserted.

2. The particle concentration analyzing system of claim 1, wherein said working fluid tank, said working fluid pump, said sample fluid input, said condensation particle counter, and said electronic control unit are interconnected as an assembly and adapted to count particles in the sample fluid.

3. The particle concentration analyzing system of claim 1, further comprising a position sensitive switch configured to automatically disable said analyzing system when said analyzing system is not properly positioned, said position dependent switch comprises a three-axis accelerometer.

4. The particle concentration analyzing system of claim 1, further comprising an integrated ejector diluter upstream of said condensation particle counter and a dilution pump upstream of said ejector dilutor, said ejector diluter configured to dilute the concentration of sample particles in a fluid sample at a pre-determined dilution ratio prior to the sample fluid entering said condensation particle counter, said ejector diluter and said dilution pump in electronic communication with said electronic control unit.

5. The particle concentration analyzing system of claim 4, further comprising a differential pressure sensor disposed along a flow path of said analyzing system configured to determine a pressure differential in said analyzing system.

6. The particle concentration analyzing system of claim 5, further comprising an exhaust pump downstream of said condensation particle counter and configured to draw fluid from said condensation particle counter, said exhaust pump in electronic communication with said electronic control unit, wherein said differential pressure sensor is disposed between said exhaust pump and said dilution pump and in electronic communication with a first pressure measuring port and a second pressure measuring port disposed along a flow path of said analyzing system, said differential pressure sensor configured to measure a first pressure at said first pressure measuring port disposed in said system and a second pressure at said second pressure measuring port disposed in said system, said electronic control unit is further responsive to said exhaust pump and said dilution pump to measure either of said first pressure by selectively disabling said dilution pump and instructing said differential pressure sensor to measure said first pressure while said dilution pump is disabled and said second pressure by selectively disabling said exhaust pump and instructing said differential pressure sensor to measure said second pressure while said exhaust pump is disabled, said electronic control unit is adapted to calculate a pressure differential between said first pressure and said second pressure.

7. The particle concentration analyzing system of claim 1, wherein said working fluid tank is self-contained and removable from said condensation particle counter, said working fluid tank is sealed, such that it does not leak when moved.

8. The particle concentration analyzing system of claim 7, wherein said working fluid tank further comprises a water absorbing material for preventing contamination or deterioration of the working fluid.

9. The particle concentration analyzing system of claim 1, further comprising a gas sensor disposed downstream of said working fluid tank and configured to measure purity of the working fluid transferred from said working fluid tank to said fluid saturation chamber.

10. The particle concentration analyzing system of claim 1, further comprising a solvent recovery system configured to recover working fluid from an exhaust flow of the sample fluid exhausted from said condensation particle counter after passing through said optical particle counter, said solvent recovery system returns recovered working fluid to said working fluid tank to be reused in said particle concentration analyzing system.

11. The particle concentration analyzing system of claim 1, further comprising a gas concentration sensor downstream of said sample fluid input and adapted to measure a gas concentration in said particle concentration analyzing system, wherein said electronic control unit is further adapted to determine if said particle concentration analyzing system is calibrated by comparing the gas concentration measured at said gas concentration sensor to a known gas concentration of a reference gas introduced into said particle concentration analyzing system upstream of said gas concentration sensor, wherein said electronic control unit is configured to calculate and determine if the measured gas concentration is within a specified range of the known gas concentration.

12. The particle concentration analyzing system of claim 1, wherein said electronic control unit further comprises a wireless communications system adapted to wirelessly communicate with said electronic control unit to control said particle concentration analyzing system.

13. The particle concentration analyzing system of claim 1, wherein said working fluid pump is a peristaltic pump configured to automatically fill said working fluid tank with a working fluid.

14. A particle concentration analyzing system adapted to count a particle concentration in a sample fluid, comprising:
a working fluid tank adapted to contain a working fluid;
a condensation particle counter comprising a fluid saturation chamber configured to saturate an ambient air with a working fluid, a condenser configured to condense the working fluid saturated ambient air from said fluid saturation chamber onto a sample fluid from a sample fluid input, and an optical particle counter configured to count sample particles present in the sample fluid;
a working fluid pump adapted to transfer the working fluid from said working fluid tank to said fluid saturation chamber;
a fluid level sensor disposed inside said fluid saturation chamber;
a downstream pump downstream of said condensation particle counter and different from said working fluid pump;
an upstream pump upstream of said condensation particle counter and different from said working fluid pump and said downstream pump;
a differential pressure sensor disposed along a flow path of said analyzing system and in electronic communication with said downstream pump and said upstream pump, said differential pressure sensor configured to determine a pressure differential in said analyzing system; and
an electronic control unit responsive to said downstream pump, said upstream pump, and said differential pressure sensor to determine a pressure differential between said downstream pump and said upstream pump;
said electronic control unit configured to selectively disable said upstream pump and to instruct said differential pressure sensor to measure a downstream pump pressure while said upstream pump is disabled and said downstream pump is operating and to selectively disable said downstream pump and to instruct said differential pressure sensor to measure an upstream pump pressure while said downstream pump is disabled and said upstream pump is operating, said controller is adapted to calculate a pressure differential between the downstream pump pressure and the upstream pump pressure based on the pressures measured at the differential pressure sensor; and
said electronic control unit responsive to said fluid level sensor to control said working fluid pump to automatically fill said fluid saturation chamber with working fluid in response to information from said fluid level sensor regarding working fluid level in said fluid saturation chamber.

15. The particle concentration analyzing system of claim 14, wherein said downstream pump comprises an exhaust pump configured to draw fluid from said condensation particle counter and said upstream pump comprises a dilution pump comprising a portion of an ejector dilution system disposed upstream of said condensation particle counter, said ejector dilution system configured to dilute the concentration of sample particles in the sample fluid at a predetermined dilution ratio prior to the sample fluid entering said condensation particle counter.

16. A method for analyzing particle concentrations in a fluid sample with a particle concentration analyzing system having a working fluid tank, a sample fluid input to receive the sample fluid to be analyzed, a condensation particle counter with a fluid saturator block, a condenser, and an optical particle counter, a working fluid pump, a fluid level sensor disposed inside the fluid saturator block, and an electronic control unit, said method comprising:
pumping a working fluid from the working fluid tank to the fluid saturator block with the working fluid pump, wherein said pumping the working fluid comprises:
the electronic control unit controlling the working fluid pump to automatically fill the fluid saturator block with working fluid in response to information from the fluid level sensor regarding the working fluid level in the fluid saturator block, wherein the electronic control unit is responsive to the fluid level sensor to control the working fluid pump;
directing a flow of ambient air into the fluid saturator block;

saturating the ambient air with the working fluid with the fluid saturator block that is configured to saturate the ambient air with the working fluid to produce a saturated fluid flow;

transporting a mixture of the saturated fluid from the fluid saturator block and the sample fluid from the sample fluid input into the condenser;

condensing the saturated fluid onto sample particles in the sample fluid with the condenser to grow the sample particles, wherein the condenser is configured to condense the saturated fluid from the fluid saturator block onto the sample fluid;

transporting the grown sample particles through the particle counter;

counting the grown sample particles with the particle counter, which is configured to count sample particles present in the sample fluid;

receiving information from the particle counter at the electronic control unit, which is in electronic communication with the particle counter; and determining a concentration of the sample particles of the sample fluid with the electronic control unit;

wherein the particle concentration analyzing system further comprises a mixing chamber downstream of the saturator block and upstream of the condenser, wherein said transporting a mixture of the saturated fluid from the fluid saturator block and the sample fluid from the sample fluid input into the condenser comprises transporting the saturated fluid from the fluid saturator block to the mixing chamber and transporting the sample fluid from the sample fluid input to the mixing chamber, and mixing the saturated fluid with the sample fluid in the mixing chamber to create the mixture of the sample fluid and the saturated fluid.

17. The method of claim 16, further comprising:

diluting the sample fluid in an ejector dilutor and transporting the diluted sample to the mixing chamber by a dilution pump upstream of the mixing chamber;

exhausting the counted sample particles from the particle counter with an exhaust pump downstream of the particle counter;

alternatingly disabling the dilution pump and the exhaust pump with the electronic control unit, the electronic control unit having a plurality of pump switches;

measuring pressures between the dilution pump and the exhaust pump with a differential pressure sensor in electronic communication with the electronic control unit while alternatingly disabling the dilution and exhaust pumps; and calculating, with the electronic control unit, a pressure differential between the dilution pump and the exhaust pump.

18. A particle concentration analyzing system adapted to count a particle concentration in a sample fluid, comprising:

a working fluid tank adapted to contain a working fluid;

a sample fluid input configured to receive the sample fluid to be analyzed;

a condensation particle counter comprising a fluid saturation chamber configured to saturate an ambient air with the working fluid, a condenser configured to condense the working fluid saturated ambient air from said fluid saturation chamber onto the sample fluid, and an optical particle counter configured to count sample particles present in the sample fluid;

a working fluid pump adapted to transfer the working fluid from said working fluid tank to said fluid saturation chamber;

a fluid level sensor disposed inside said fluid saturation chamber; and an electronic control unit responsive to said optical particle counter to count sample particles present in the sample fluid, and said electronic control unit responsive to said fluid level sensor to control said working fluid pump to automatically fill said fluid saturation chamber with working fluid in response to information from said fluid level sensor regarding working fluid level in said fluid saturation chamber;

further comprising a gas sensor disposed downstream of said working fluid tank and configured to measure purity of the working fluid transferred from said working fluid tank to said fluid saturation chamber.

19. The particle concentration analyzing system of claim 18, further comprising a position sensitive switch configured to automatically disable said analyzing system when said analyzing system is not properly positioned, said position dependent switch comprises a three-axis accelerometer.

20. The particle concentration analyzing system of claim 18, further comprising a sampling probe for insertion into a vehicle exhaust pipe and a sampling line coupled at one end to said sampling probe and removably coupled at an opposite end to said sample fluid input upstream of said condenser, said sampling line is in fluid communication with said sample fluid input and said sampling probe.

* * * * *